UNITED STATES PATENT OFFICE.

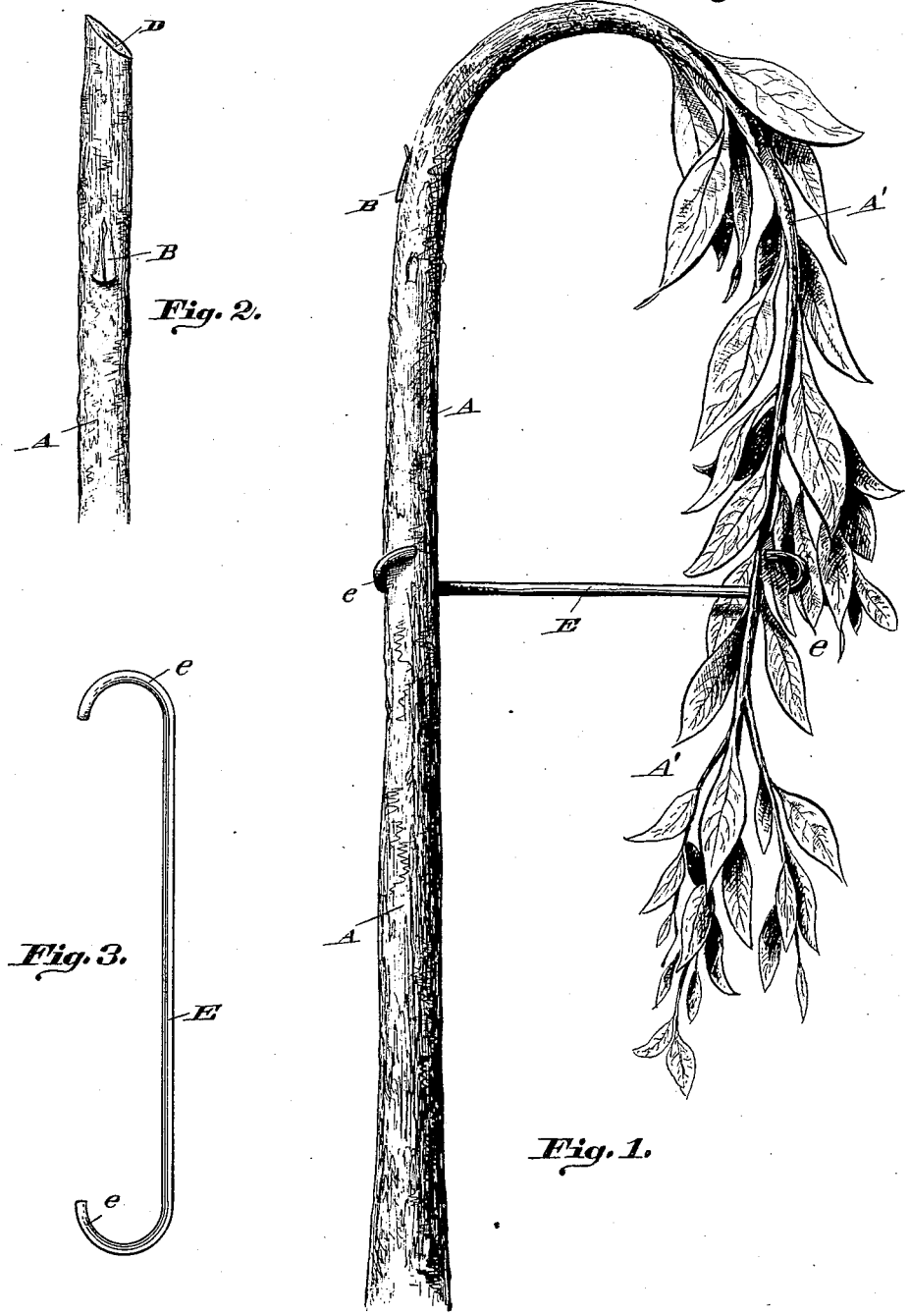

HENRY GULICK, OF ORANGE COUNTY, FLORIDA.

METHOD OF BUDDING TREES.

SPECIFICATION forming part of Letters Patent No. 346,905, dated August 10, 1886.

Application filed February 17, 1886. Serial No. 192,191. (No model.)

*To all whom it may concern:*

Be it known that I, HENRY GULICK, a citizen of the United States, and a resident of Orange county, in the State of Florida, (post-office address, Summit, Marion county, Florida,) have invented certain new and useful Improvements in Budding Trees, of which the following is a specification.

The object of my invention is to obviate certain difficulties met with in budding orange-trees.

The invention, besides obviating these difficulties, possesses advantages and secures results not attainable by other processes now in use. It is particularly applicable to citrus and other evergreen trees.

The most approved method now in use of budding citrus and other evergreen trees is to insert the bud under the bark of the growing tree; then carefully and tightly wrap with a strip of waxed muslin, not only to hold the bud in position, but also to keep out air and moisture. After remaining in this condition for two weeks the bandage is removed, and if the bud is living the tree is cut off at once a few inches above the bud, and all branches and suckers, if any, below the bud are also removed. That portion of the stalk left above the bud is technically known as the "stub," and is utilized to tie the bud to after it has grown a few inches long, to keep it in an upright position, and to prevent its being blown off.

Cutting off the whole top of a young evergreen tree during the growing season, in order to start the bud, very much impairs its vigor. Its leaves or lungs are gone, and it can only draw on the small store of organizable matter laid up in the roots and remaining trunk to make a first, feeble, and slender growth. To practically obviate the difficulties of this old process is the object of my invention.

In the accompanying drawings, Figure 1 represents a tree as treated by my process of budding. Fig. 2 shows a bud in front view, and also shows the so-called "stub" of the old process. Fig. 3 illustrates the instrument which I use to hold the bent tree.

Instead of cutting off the top of the budded tree in order to start the bud, as before described in the old process, by my invention it is carefully bent over just above and in a direction away from the bud until the top points downward, and is held in that position by means of a stout wire, with each end bent in the form of a hook. One end of the wire is hooked around the trunk of the tree, and the other clasps the bent-over top. When the bud is inserted low down in the stock, near the ground, the top is bent until it crosses the trunk below the bud, with the lower branches resting on the ground, and it is held in position, as above described, except that the hooked wire is shorter.

By the above-described process the vigor of the tree has not been impaired by the shock and subsequent evil results of amputation, but the leaves are left to perform their respiratory functions. Most of the sap is arrested at the bend, and the bud and numerous sprouts start at this point. The latter are rubbed off, and the whole sap is directed to the bud, which makes an upright, stout, and rapid growth, much more so than by the old process. When the bud has grown to the height of about eighteen inches, I find it advisable to pinch it back—that is, to cut off a half inch or so of the tender top to arrest its growth in that direction, and cause it to harden up to resist the wind, and also throw out branches. As the upward growth is checked, the diameter of the bud and stock below the bud is rapidly increased, the leaves expand to the largest size, and in a short time it attains enough vigor to throw out branches at the point where pinched back, and in turn these branches are pinched back when they have attained a growth of eighteen inches, or sooner, if they show a tendency to lop down. In two or three months the original or old top of the tree may be cut off. The bud is then large enough to receive all the sap. In the old process of budding it is usually necessary to tie up the bud, after it has made a short start, to the stub, or a stake put in the ground for the purpose. By my process this tedious and laborious operation is avoided. In the first place, the bud by my process is so inserted that its original direction is more nearly vertical than buds started by the old process; secondly, the conditions present so favor its growth as to produce at once a sturdy vigorous branch, which does not need support from without. It also produces a tree much straighter and handsomer, and nearly twice as large in one season's growth as that produced by the old process.

As the tree is still supplied with leaves, with which to continue the growth, two or even three buds may be successively inserted into a tree, if the first or second bud should be broken off. This is an important advantage. Whereas, in the old process, if a bud is broken off the tree is often too much enfeebled by the loss of the top to start another bud the same season, but requires a year to recuperate.

Another important advantage of my process is that it extends the budding season at least a month later. A bud set in June will grow and harden up sooner than one set in May by the old process. While the various features of my invention are preferably employed together, one or more of said features may be employed without the remainder.

I am aware that in a process of side grafting the branches have been allowed to remain on the tree, but am not aware that the trunk of the tree has ever before been bent over and the graft inserted at or near the bend, as set forth in the preceding specification. The advantage which follows from bending the trunk over, as in my method, over that process of side grafting in which the branches are allowed to remain in an upright position, is as follows: When the trunk is bent over, the sap is directed more particularly to the graft near the highest point of the bend, and less so to the branches beyond, and in consequence a much more rapid and hardy growth is acquired by the graft than can be obtained by any other process.

What I claim as new and of my invention, and desire to secure by Letters Patent, is—

The process of budding trees, consisting of the following steps, viz: first inserting the bud under the bark, and afterward bending the top of the tree down and holding it in position by appropriate means, substantially as specified.

HENRY GULICK.

Witnesses:
J. S. BLACKMAN,
E. V. BLACKMAN.